United States Patent [19]
Fukuoka

[11] Patent Number: 5,106,445
[45] Date of Patent: Apr. 21, 1992

[54] METHOD OF MANUFACTURING A SHOE

[76] Inventor: Tatsuo Fukuoka, 3-3, Shinminamifukushima 2-Chome, Tokushima-shi Tokushima, Japan, 770

[21] Appl. No.: 544,648

[22] Filed: Jun. 26, 1990

Related U.S. Application Data

[62] Division of Ser. No. 450,154, Dec. 13, 1990, abandoned.

[51] Int. Cl.⁵ .............................................. B29C 41/22
[52] U.S. Cl. .................................. 156/242; 156/245; 264/244; 264/251; 264/259; 264/328.1; 36/45; 36/68; 36/84; 36/87
[58] Field of Search ............... 156/245, 242; 264/244, 264/251, 259, 328.1, 513; 36/45, 68, 84, 87

[56] References Cited

U.S. PATENT DOCUMENTS

| | | | |
|---|---|---|---|
| 244,349 | 7/1881 | Wilber | 36/45 X |
| 2,714,733 | 8/1955 | Herlihy | 36/68 X |
| 2,982,033 | 5/1961 | Bingham, Jr. | 36/45 X |
| 3,020,169 | 2/1962 | Phillips, Jr. et al. | 36/68 X |
| 3,170,252 | 2/1965 | Ravich | 36/68 |
| 3,823,493 | 7/1974 | Brehm | 36/87 |
| 4,858,339 | 8/1989 | Hayafuchi et al. | 36/68 X |

FOREIGN PATENT DOCUMENTS

| | | | |
|---|---|---|---|
| 2504786 | 11/1982 | France | 36/87 |

*Primary Examiner*—Caleb Weston
*Attorney, Agent, or Firm*—Wenderoth, Lind & Ponack

[57] ABSTRACT

A light, comfortable, lined shoe made of soft synthetic resin that employs another more durable hot-melt bond synthetic resin in the critical heel and foot entry opening regions to prevent shape distortion over the long term is provided. An extremely simple method of manufacture allows the shoe to be made inexpensively in quantity.

10 Claims, 2 Drawing Sheets

METHOD OF MANUFACTURING A SHOE

This application is a division of now abandoned application Ser. No. 07/450,154 filed on Dec. 13, 1989, now abandoned.

BACKGROUND OF THE INVENTION

This invention relates to a shoe with a liner inserted during formation of the shell (in this description the body of the shoe, less the liner, sole, and any other part not formed as a unit with the body, is referred to as the shell), and more particularly to a shoe with a synthetic resin shell that can prevent the shape of the shoe from collapsing.

A shoe with part, or all of its shell molded from synthetic resin has features unattainable with a shoe sewn from leather or cloth. Namely, the construction of this shoe does not entail cutting flat pieces of material from a sheet and shaping them in three dimensions to follow the contour of the foot, but rather the shell of the shoe is formed into a three dimensional shape using a mold. Therefore, this shoe has the features that it is "broken in" from the first wearing, and it can be worn in comfort, even for long periods, without fatigue. Another feature of the shoe having this construction is that the labor of working with sheet material for the shell is unnecessary, and the shoe is extremely easy to produce in quantity.

Although the solid shell having curved surfaces formed by molding collapses little compared with shells made of leather or cloth, the opening for foot entry gradually widens with wear. This can be reduced by making the synthetic resin shell thicker. However, a shoe with a thick shell has the drawback that it is heavy and wearing comfort is reduced.

The present invention was developed to overcome this drawback.

It is thus a primary object of the present invention to provide a shoe that prevents collapse of the shell over long periods.

It is yet another primary object of the present invention to provide a shoe that has a thin, light shell that can prevent collapse of its shape.

It is a further primary object of the present invention to provide a shoe that is easily produced in quantity without the use of a special process to heat a hot-melt bond (a synthetic resin adhesive with rigidity), but rather to heat the hot-melt bond with molten synthetic resin at the same time the shell is molded. This forms the shell with support and retention of the liner at the same time.

SUMMARY OF THE INVENTION

The shoe of the present invention has a liner that adheres in close contact to the synthetic resin shell and is inserted when the shell is molded. The liner is supported and retained by hot-melt bond at the foot entry opening part and/or the heel part of the liner.

A shoe with the liner inserted on the inside of the shell 1 is made by the following process steps.

1. First the liner 2 is sewn to the shape of the foot, then the liner 2 is attached to the male, or central foot shaped piece of the mold used to form the shell.

2. Next, after the mold is closed, synthetic resin is injected into the cavity of the mold to form the shell 1. The liner 2 is thereby inserted in the inside of the shell 1.

In the shoe of the present invention, the shape of the liner 2 around the foot entry opening and/or at the heel is supported by hot-melt bond 3. Before the liner 2 is attached to the center piece of the mold, hot-melt bond 3 is applied to the liner 2. The hot-melt bond 3 is heated and melted by the injection of hot molten synthetic resin into the mold cavity during formation of the shell 1. At this time, the hot-melt bond 3 is pressed against the shell 1 all along its contour by the closed mold, it is formed in a shape following the contour of the shell 1 at the same time the shell is formed, and it cools and hardens in that shape.

Consequently, in the shoe of the present invention, not only is the liner 2 supported and retained by the hot-melt bond 3, but also when the shell 1 is formed, the hot-melt bond 3 forms in a shape following the contour of the shell 1, and it, therefore, retains the shell's shape and prevents its collapse.

Incidentally, both the shell 1 and the hot-melt bond 3 are synthetic resins, but a synthetic resin with excellent support qualities can be used for the hot-melt bond 3 while an exceptionally flexible and comfortable to wear synthetic resin can be used for the shell 1. Normally, a synthetic resin with good comfort of wear, such as soft vinyl chloride or urethane, is used for the shell 1, and a synthetic resin with excellent support and rigidity is used for the hot-melt bond 3. Consequently, a shell 1 with the features of comfort as well as durability is realized.

Further, since the shell 1 is prevented from losing its shape by hot-melt bond 3 reinforcement, a thin, light, and comfortable to wear shell 1 that can effectively maintain its shape is realized.

Still further, to preserve the shape of the shell 1, hot-melt bond 3 is applied to the liner 2. However, there is no need for a special process to melt the hot-melt bond 3 and form it along the contour of the shell 1 because it is heated by molten synthetic resin when the shell 1 is formed. At the same time the shell 1 is formed, the hot-melt bond 3 forms with it in an ideal shape realizing the feature of simple manufacture for low cost, high quantity production.

DESCRIPTION OF THE PREFERRED EMBODIMENT

Figure 1:
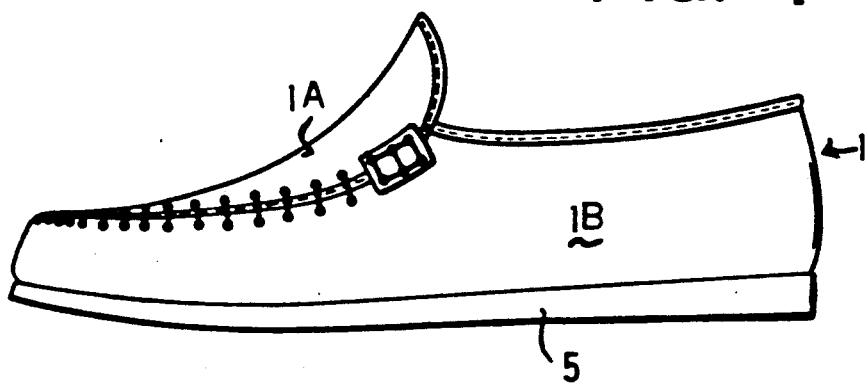
FIG. 1 is a side view of a shoe according to the present invention.

The preferred embodiment of the present invention will now be described with reference to the drawing figures.

However, this embodiment of the present invention is intended only as a specific example of the technology involved in the shoe of this invention, which is in no way restricted to the materials, shapes, construction, or positions of parts described in the following embodiment. It is therefore to be understood that, in the scope of the appended claims, the invention may be practiced other than specifically described.

Figure 2:
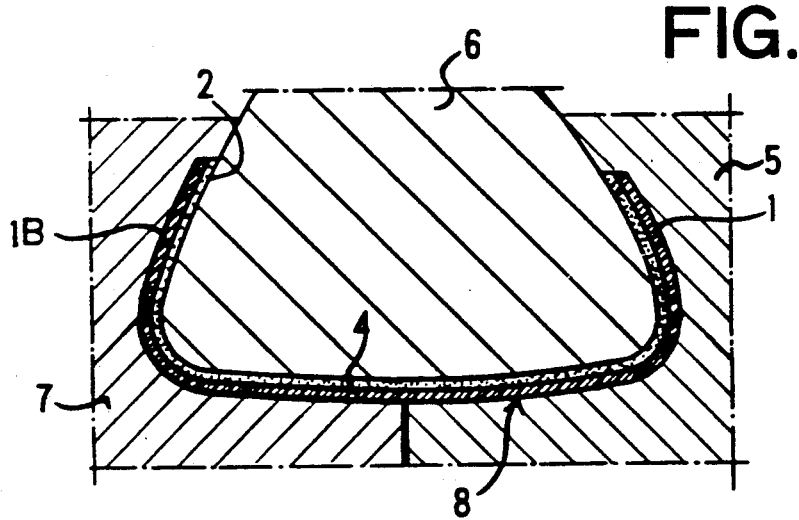
FIG. 2 is a cross sectional view of the shoe during molding.

FIG. 1 shows the shell 1 of the shell including a shell body 1B and a shell vamp 1A. As shown in FIG. 2, a liner 2 is inserted within the mold during formation of the shell body 1B to be formed in close adhesion with the inner surface of the shell body 1B.

The shell body 1B and the middle sole 4 are formed in a three dimensional curved shape to follow the contour of the foot. They are formed from a pliable synthetic resin such as soft poly vinyl chloride, urethane resin, or a mixture of these and/or other compounds.

After forming the shell body 1B from synthetic resin and sewing on the shell vamp 1A, the sole 5 is attached, or after molding the shell 1 and middle sole 4, the sole 5 is formed under the middle sole 4.

Figure 3:
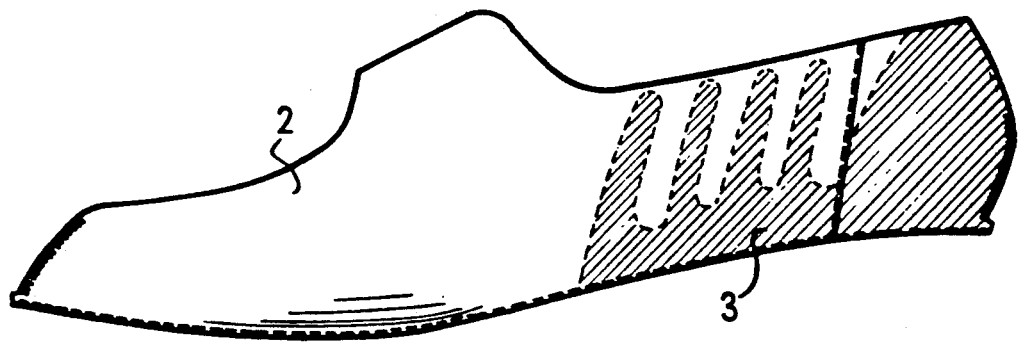
FIG. 3 and FIG. 4 are side views of the liner.

In the oblique hatched areas shown in FIG. 3, hot-melt bond 3 is applied to the foot entry opening and heel regions of the liner 2. The hot-melt bond 3 is thinly applied to the outer surface of the liner 2 shown in FIG. 3 at the foot entry opening and heel regions. A liner 2 with hot-melt bond 3 applied to both the foot entry opening and heel regions in this manner results in a shell 1 which most effectively prevents widening of the foot entry opening.

However, although not illustrated, in the shoe of the present invention it is also possible to prevent shape distortion of the shell 1 by application of hot-melt bond 3 to either the foot entry opening region or the heel region of the liner 2, but not to both regions.

Further, the hot-melt bond 3 applied to the outer surface of the liner 2 does not come in direct contact with the foot, but rather, the ventilating liner 2 intervenes allowing the shoe to be worn in comfort.

Although not illustrated, it is also possible to apply the hot-melt bond 3 in lines along the outer surface of the liner 2. These lines of hot-melt bond 3 then act as reinforcement ribs to maintain the shape of the shell 1.

The optimum amount of hot-melt bond 3 applied is determined by considering the stiffness of the hot-melt bond 3 after hardening, the amount of support required by the shell 1, and the amount of shell 1 flexibility necessary. Normally the thickness of hot-melt bond 3 application is adjusted between 0.1 to 1 mm.

Any synthetic resin that softens at temperatures attained during formation of the shell 1, deforms onto the contour of the shell 1, and hardens with cooling to maintain the shape of the shell 1, can be used as the hot-melt bond 3. For example, synthetic resins that soften with heating such as ethyl acetate vinyl copolymer can be used.

The simplest way to adhere hot-melt bond 3 to the liner 2 is, as shown in FIG. 3, by direct application of the hot-melt bond 3 to the surface of the liner 2.

Figure 4:
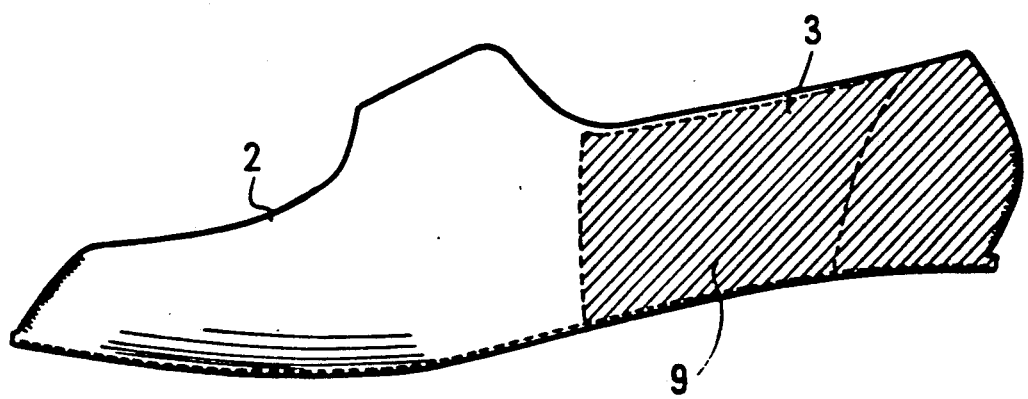

However, in the shoe of the present invention, a separate sheet of material 9 can also be used to adhere the hot-melt bond 3 to the liner 2. For example, sheet material 9 in the shape delineated by the broken lines shown in FIG. 4 can be covered with, or immersed in hot-melt bond 3, temporarily fixed to the surface of the liner 2, and then used in molding the shell 1.

Sheet material 9 suitable for application of hot-melt bond or immersion into hot-melt bond is material that has a high porosity for absorbing large amounts of hot-melt bond such as cloth or nonwoven cloth.

It is also possible to process the hot-melt bond itself into a sheet, temporarily attach it to the liner 2, and form the shell 1. The hot-melt bond sheet can be temporarily attached to the liner 2 with bond or by sewing.

The use of a separate sheet of material 9 to adhere the hot-melt bond 3 to the liner 2 is an effective method of adhering thick applications of the hot-melt bond 3.

To assure that the liner 2 is against the mold center piece 6 when the mold is closed, it is sewn into a shape which follows the contour of the inner surface of the shell 1. This has the feature that the liner 2 sewn into the overall shape of the foot can be temporarily held against the mold center piece 6 simply by putting it on the mold center piece 6.

Any sheet material that provides cushioning and ventilation can be used as the liner 2. Pliable urethane foam having continuous aeration and with cloth attached to both sides was found to be optimum in experiments conducted by the inventor. For sufficient cushioning, urethane foam with a thickness of 1 to 2.5 mm is used. Relatively thick, strong cloth that won't tear over long periods is used on the inside surface of the liner 2 that comes in contact with the foot. Thin cloth with a relatively loose weave and thin fiber is most suitable for the side of the liner 2 in close adhesion with the shell 1.

The urethane foam liner 2 with cloth applied to its outer surface has the feature that synthetic resin for the formation of the shell body 1B is prevented by the cloth from invading the pores of the urethane foam.

The shoe illustrated in FIG. 1 is manufactured by the following process. As shown in FIG. 2, a liner 2 with hot-melt bond 3 applied to its outer surface is put around the mold center piece 6, and the mold 7 is closed. Synthetic resin is forced under pressure into the cavity 8 of the closed mold 7 to form the shell body 1B and middle sole 4 as an integrated synthetic resin unit. At the same time, the molten synthetic resin also heats the hot-melt bond 3 molding it to the contour of the the shell 1. The piece is then discharged from the mold 7, the shell vamp 1A is sewn to the shell body 1B, a cloth hem piece is sewn around the edge of the foot entry opening, and the sole 5 is attached.

What is claimed is:

1. A method of manufacturing a shoe, comprising the steps of:
   providing a mold center piece and a mold shaped to form a shell body of the shoe;
   mounting a liner in contact with at least a portion of the outer surface of said mold center piece;
   coating at least a portion of the outer surface of said liner with a hot-melt bond material;
   placing the combination of said mold center piece, said liner and said hot-melt bond material into said mold such that a space is formed between said mold and the combination of said mold center piece, said liner and said hot-melt bond material;
   filling said space with a heated molten synthetic resin material such that heat from said heated molten synthetic resin material causes said hot-melt bond material to melt; and
   cooling said synthetic resin material and said hot-melt bond material such that said synthetic resin material forms said shell body, and said hot-melt bond material bonds to said shell body and said liner and acts to stiffen said shell body.

2. A method as recited in claim 1, wherein said liner is about 1-2.5 millimeters thick.

3. A method as recited in claim 1, further comprising the step of
   attaching a shell vamp to said shell body.

4. A method as recited in claim 1, wherein
   said hot-melt bond material is coated on said liner so as to have a thickness of about 0.1-1.0 millimeters.

5. A method as recited in claim 1, wherein
   said hot-melt bond material comprises a synthetic resin.

6. A method as recited in claim 5, wherein said synthetic resin comprises ethyl acetate vinyl copolymer.

7. A method as recited in claim 1, wherein
said hot-melt bond material is coated onto said liner by first applying the hot-melt bond material to a separate sheet of material and then applying said separate sheet to said liner.

8. A method as recited in claim 1, wherein
said hot-melt bond material is coated onto said liner by first processing the hot-melt bond material into a sheet formed of said hot-melt bond material and then attaching said sheet to said liner.

9. A method as recited in claim 1, wherein
prior to mounting said liner in contact with said mold center piece, said liner is sewn into a shape which is complementary to the inner contour of said shell body and then mounted against said mold center piece.

10. A method as recited in claim 1, wherein
said liner comprises a pliable urethane sheet having cloth attached on at least one side thereof.

* * * * *